United States Patent [19]

Lüscher et al.

[11] 4,382,811

[45] May 10, 1983

[54] METHOD OF PRODUCING PROTECTIVE COATINGS ON METAL PARTS TO BE USED IN CONTACT WITH MOLTEN GLASS

[75] Inventors: Paul Lüscher, Lausanne; Hans-Theo Steine, Chavannes, both of Switzerland

[73] Assignee: Castolin S.A., Saint-Sulpice, Switzerland

[21] Appl. No.: 247,246

[22] Filed: Mar. 25, 1981

[30] Foreign Application Priority Data

Mar. 27, 1980 [CH] Switzerland ............... 2400/80

[51] Int. Cl.³ .............................. B05D 1/06
[52] U.S. Cl. ................. 65/374.11; 65/374.1; 427/34; 427/422; 427/423; 428/472; 428/702
[58] Field of Search ............ 427/422, 34, 423; 65/374.11, 374.1; 428/472, 702

[56] References Cited

U.S. PATENT DOCUMENTS 3,436,511 4/1969 Rath ........................ 427/423
4,313,975 2/1982 Mairy ....................... 427/423

FOREIGN PATENT DOCUMENTS 731543 4/1966 Canada ..................... 427/423
910621 11/1962 United Kingdom ............ 427/423

*Primary Examiner*—Shrive P. Beck
*Attorney, Agent, or Firm*—Hopgood, Calimafde, Kalil, Blaustein & Judlowe

[57] ABSTRACT

Method of producing protective coatings on metal parts to be used in contact with molten glass.

The method of the invention comprises spraying onto the surface to be coated, by a thermal spraying process such as flame or plasma spraying, a powdered material consisting essentially of at least 60% by weight of chromium oxide, from 0 to 40% by weight of a nickel-base alloy such as a nickel-chromium alloy and from 0 to 20% by weight of metal oxides such as aluminum, titanium and zirconium oxides.

6 Claims, No Drawings

METHOD OF PRODUCING PROTECTIVE COATINGS ON METAL PARTS TO BE USED IN CONTACT WITH MOLTEN GLASS

This invention relates to a method of producing a protective coating on metal parts to be used in contact with molten glass. In particular, the invention relates to a method comprising the forming of a protective coating by spraying a powdered material onto the surface of the metal part to be protected, by a process of thermal spraying such as a flame spraying or plasma spraying process.

It is known, in the glass making industry, in particular in the manufacturing of glass-ware, to provide machine parts which in use are in contact with molten glass, with a protective coating of graphite in order to increase the wear resistance of those parts at the very high working temperatures to which they are submitted. However, even with such a coating, those parts have a rather short life, so that frequent replacement is necessary which results in a reduction of the effeciency of the whole manufacturing installation and increases the manufacturing costs.

It is the main object of the invention to provide a method of producing a protective coating on metal parts of a glass manufacturing installation which are in contact with molten glass to obtain a coating that is highly resistant under the extreme and particular working conditions of those parts and accordingly to increase the life of said parts. This and other objects will more clearly appear from the following disclosure.

Broadly stated, the method of the invention comprises spraying onto the surface to be coated, by a thermal spraying process, a powdered material consisting essentially of at least 60% by weight of chromium oxide, from 0 to 40% by weight of a nickel-base alloy and from 0 to 20% by weight of metal oxides. According to a preferred embodiment said chromium oxide is a substoichiometric chromium sesquioxide. Said nickel-base alloy is preferably a nickel-chromium alloy containing up to 50% by weight of chromium and the metal oxides used are preferably those of aluminum and/or titanium and/or zirconium.

It has been found that the thermal spraying of powders containing essentially chromium oxide allows to produce a protective coating of excellent quality as well regarding its thermal and mechanical resistance at high temperatures as with respect to its behaviour when in contact with molten glass. It was found in particular that glass at high temperature or in the molten state showed no tendancy to adhere to the coating produced in accordance with the invention.

The thermal spraying process used can be a conventional flame spray process using a metal spray torch well-known in the art, for example an oxyacetylene torch or an electric arc torch, whereby preferably first a bond coat is applied onto the prepared surface of the metal part as described for instance in U.S. patent No. 4202691. According to a preferred embodiment, the method of the invention uses the well-known process of plasma spraying which under certain circumstances allows to apply the powdered material directly onto the prepared surface of the metal part to be coated.

As illustrative of the invention, the following examples are given.

EXAMPLE 1

In a glass-making machine a protective coating was applied to the distribution gutter supplying molten glass to the hollow glass moulds of the machine. the following method was employed:

The guiding surfaces of the gutter were blasted with emery to produce a surface having a roughness of about 25 $\mu$m. Then a bond coat was applied onto these surfaces by means of a plasma spraying torch using a 80/20 nickel-chromium powder of about 45 to 90 $\mu$m and a argon-hydrogen plasma. The electrical energy was 36 kW. The thickness of the bond coat was 0.05 mm. Onto the same the protective coating was sprayed with the same plasma spray torch with the same plasma gases but with an electrical energy of 42 kW. The powder sprayed was chromium oxide in a grain range of about 5 to 45 $\mu$m and the thickness of the coating was 0.2 mm.

The life of the so coated gutter appeared to be 12-times the life of an uncoated gutter as used previously.

EXAMPLE 2

A plunger for the production of hollow glass-ware was coated as follows:

After roughening to a surface roughness of about 15 $\mu$m, a coating from a powder mix consisting of 65% by weight of chromium oxide and 35% by weight of 80/20 nickel-chromium powder in a grain size range from about 37 to 90 $\mu$m was applied by means of an oxyacetylene flame spray torch. The thickness of the coating was 0.4 mm. The plunger was then grinded in a profile grinding machine and polished to reach a surface roughness of about 4 $\mu$m.

It appeared in use that the plunger had no tendancy to adhere to the glass and its life was increased by 3-times as compared with an uncoated plunger.

EXAMPLE 3

The funnel of a hollow glass mould was coated as follows:

The surface to be coated was sand-blasted to a roughness of 10 $\mu$m and a powder consisting of 70% chromium oxide and 30% zirconium oxide with a grain size range of 5 to 45 $\mu$m was applied thereupon by means of a plasma spray torch using an argon-nitrogen plasma and having an electrical energy of 48 kW. The thickness of the protective layer was 0.15 mm. The surface was then polished and the funnel used as a preforming funnel in hollow glass-ware production. The life appeared to be substantially increased and the outflow of the viscous glass was considerably improved.

EXAMPLE 4

A preforming mould of a glass machine was provided with a protective coating as follows:

After grinding of the surface to be coated, a powder mix consisting of 67% by weight of chromium oxide and 15% by weight of titanium dioxide in a grain size range of 15 to 63 $\mu$m, and 18% weight of 60/40 nickel-chromium alloy in a grain size range of 45 to 90 $\mu$m, was applied by means of an oxyacetylene torch. The thickness of the coating was 0.35 mm and its surface was polished before use.

The life of the thus coated preforming mould was increased by 4-times as compared with the ones previously used.

We claim:

1. A method of producing a protective coating on metal parts to be used in contact with molten glass, which comprises thermally spraying onto the surface to be coated a powdered material consisting essentially of at least about 60% by weight of sub-stoichiometric chromium sesquioxide, and optionally from 0 to about 40% by weight of a nickel-base alloy and from 0 to about 20% by weight of at least one metal oxide, said optional material when present making up substantially the balance.

2. The method of claim 1, wherein said nickel-base alloy is a nickel-chromium alloy containing up to about 50% by weight of chromium.

3. The method of claim 1, wherein said at least one metal oxide is selected from the group consisting of oxides of aluminum, titanium, and zirconium.

4. A glass-making machine part having a surface coating thereon, said part being employed as an element in the glass-making industry, wherein said coated surface is used in contact with molten glass, said coating being formed of a thermally bonded layer consisting essentially of at least about 60% by weight of sub-stoichiometric chromium sesquioxide, and optionally 0 to about 40% by weight of a nickel-base alloy and 0 to about 20% by weight of at least one metal oxide, said optional material when present making up substantially the balance.

5. The glass-making machine part of claim 4, wherein said nickel-base alloy is a nickel-chromium alloy containing up to about 50% by weight of chromium.

6. The glass-making machine part of claim 4, wherein said at least one metal oxide is selected from oxides of aluminum, titanium, and zirconium.

* * * * *